UNITED STATES PATENT OFFICE.

CARL ALEXANDER MARTIUS, OF BERLIN, GERMANY.

AZO DYE.

SPECIFICATION forming part of Letters Patent No. 456,897, dated July 28, 1891.

Application filed August 22, 1888. Serial No. 283,462. (Specimens.) Patented in Germany March 29, 1888, No. 47,136, and in England April 20, 1888, No. 5,909.

*To all whom it may concern:*

Be it known that I, CARL ALEXANDER MARTIUS, director of the Actien-Gesellschaft für Anilin Fabrikation, of Berlin, in the Kingdom of Prussia, German Empire, have invented new and useful Improvements in the Manufacture of Azo Coloring-Matters from a New Alpha-Naphthol Disulphonic Acid, (for which patents have been obtained in Germany, No. 47,136, dated March 29, 1888, and in England, No. 5,909, dated April 20, 1888;) and I do hereby declare that the following is a full, clear, and exact description thereof, which will enable others skilled in the art to which it appertains to make and use the same.

This invention relates to the manufacture of new and useful red, brown, violet, blue, and bluish-black azo coloring-matters by combining a new alpha-naphthol disulphonic acid with diazo compounds. The new alpha-naphthol disulphonic acid mentioned is formed by treating naphthaline disulphonic acid (as obtained by treating naphthaline with sulphuric acid, monochlorhydrine or fuming sulphuric acid) with nitric acid, then reducing the alpha-nitronaphthaline disulphonic acids so formed to alpha-amidonaphthaline disulphonic acid, and then converting the said alpha-amido-naphthaline disulphonic acid into the corresponding alpha-naphthol disulphonic acid. This acid is then combined with various azo compounds, of which the following form the more important combinations:

A. *Coloring-matters from the new alpha-naphthol disulphonic acid and diazo compounds which contain no sulphonic acid.*

*Example I.*—Coloring-matter from the new alpha-naphthol disulphonic acid and xylidine: 15.75 kilos of hydrochlorate of xylidine are dissolved in one hundred liters of water and acidulated with twelve kilos of muriatic acid. To this is slowly added, under continuous stirring, a solution of 6.9 kilos of nitrate of sodium in fifty liters of water. The solution of diazoxylol thus formed is entered into seven hundred kilos of water containing 34.8 kilos of the sodium salt of the new alpha-naphthol disulphonic acid and carbonate of sodium, enough to keep the liquid alkaline until the process is completed. The formed dye-stuff is separated by precipitation with common salt pressed and dried. It dyes wool with yellowish-red shades in an acidulated bath. If, in the above-described example, the 15.75 kilos of hydrochlorate of xylidine are replaced by the equivalent quantity of the hydrochlorates of cumidine, alpha-naphthylamine, beta-naphthylamine, amidoazo-benzole, and amido-azo-toluole dye-stuffs are obtained, which likewise yield on woolen stuffs in acidulated bath very fair shades. The coloring-matter from cumidine dyes red; alpha-naphthylamine, brown; beta-naphthylamine, red-brown; amidoazo-benzole, brown; amidoazo-toluole, brown.

*Example II.*—Coloring-matter from diamidostilbene and the new alpha-naphthol disulphonic acid: Twenty-one kilos of diamidostilbene are dissolved by means of fifty-eight kilos of muriatic acid and one thousand liters of water, and are then converted into the hydrochlorate of tetrazostilbene by adding slowly a solution of fourteen kilos of nitrite of sodium in fifty liters of water. The tetrazo compound formed is then entered into a solution of thirty-five kilos of the dried sodium salt of the new alpha-naphthol disulphonic acid and forty-one kilos of acetate of sodium in one thousand liters of water. Thus an intermediate product is obtained, which consists of one molecule of tetrazostilbene and one molecule of alpha-naphthol disulphonic acid. This intermediate product is entered into an alkaline solution of a second molecule or twenty-five kilos of the new alpha-naphthol disulphonic acid. After the mixture of the components has stood for some hours it is heated and the formed coloring-matter is separated by means of common salt, and is filtered, pressed, and dried. It dyes cotton with bluish-violet shades in a bath of sulphate of sodium without the use of a mordant.

In the above-described example the naphthol-disulphonate of sodium, which is combined with the intermediate product of tetrazostilbene and the new naphthol disulphonic acid, may be replaced by salts of other naphthol disulphonic acids, also by salts of alpha and beta naphthol and alpha and beta naphthol monosulphonic acid. The coloring-matters thus obtained also dye cotton with bluish-violet shades without the use of a mordant. Further, in the second example the diamidostilbene may be replaced in all cases by equivalent quantities of benzidine, ortho-tolidine, or dianisidine. If dianisidine is used, very clear shades are obtained. Some of these coloring-matters dye cotton with much greener shades than can be obtained by using the similar dye-stuffs which have hitherto been brought on the market.

B. *Coloring-matters from the new alpha-naphthol disulphonic acid and sulphonated diazo compounds.*

*Example III.*—If in Example I the xylidine is replaced by equivalent quantities of naphthionic acid, sulphanilic acid, azo-alpha-naphthylamine, alpha-naphthylamine disulphonic acid, azo-alpha-naphthylamine or beta-naphthylamine disulphonic acid, azo-alpha-naphthylamine, useful coloring-matters are obtained which yield on woolen stuffs in acidulated bath the following shades: The coloring-matter from naphthionic acid dyes brown-red; beta-naphthylamine beta-sulphonic acid, red; sulphanilic acid azo-alpha-naphthylamine, brown; beta-naphthylamine alpha-sulphonic acid azo-alpha-naphthylamine, brown; alpha-naphthylamine disulphonic acid azo-alpha-naphthylamine red-violet; beta-naphthylamine disulphonic acid G azo-alpha-naphthylamine, bluish black. If in Example I the diamidostilbene is replaced by diamidostilbene sulphonic acid, a coloring-matter is obtained which dyes cotton in bluish-violet shades without the use of a mordant.

The alpha-naphthol disulphonic acid herein mentioned is described and claimed in Patent No. 405,938, issued to M. Andresen, June 25, 1889.

The formula of diphenitidine is as follows, viz:

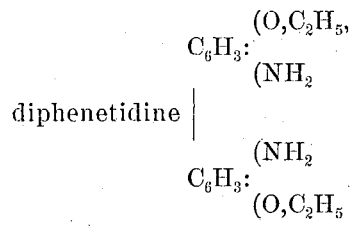

diphenetidine

The several processes not claimed in this application form the basis of and are claimed in divisional applications, Serial Nos. 337,997 and 337,998, filed by me January 24, 1890.

I claim—

The process of producing azo colors, which consists in first forming the new alpha-naphthol disulphonic acid by treating naphthalene disulphonic acid with nitric acid, reducing the alpha-nitronaphthalene disulphonic acids so formed to alpha-amidonaphthalene disulphonic acid, and converting said alpha-amidonaphthalene disulphonic acid into the corresponding new compound, alpha-naphthol disulphonic acid, then adding to a tetrazo derivative of diphenitidine the alpha-naphthol disulphonic acid, in proportion about as stated, to form a compound of one molecule of tetrazo-diphenitidine with one of the alpha-naphthol disulphonic acid, then adding to this compound another portion of the alpha-naphthol disulphonic acid, and then precipitating the dye-stuff.

CARL ALEXANDER MARTIUS.

Witnesses:
B. ROI,
F. VON VERSEN.